(12) United States Patent
Higgins

(10) Patent No.: US 8,792,337 B2
(45) Date of Patent: Jul. 29, 2014

(54) METHOD AND APPARATUS FOR PROVIDING AN UPLINK OVER AN ACCESS RING

(75) Inventor: Seth Higgins, Lewisville, TX (US)

(73) Assignee: Adva Optical Networking SE, Meiningen Ot Dreissigacker (DE)

( * ) Notice: Subject to any disclaimer, the term of this patent is extended or adjusted under 35 U.S.C. 154(b) by 177 days.

(21) Appl. No.: 13/206,103

(22) Filed: Aug. 9, 2011

(65) Prior Publication Data

US 2013/0039170 A1    Feb. 14, 2013

(51) Int. Cl.
    *G01R 31/08*    (2006.01)
(52) U.S. Cl.
    USPC .......................................... 370/228; 370/222
(58) Field of Classification Search
    USPC .................................. 370/222, 228
    See application file for complete search history.

(56) References Cited

U.S. PATENT DOCUMENTS

| | | | |
|---|---|---|---|
| 6,430,151 B1 | 8/2002 | Glas et al. | |
| 2008/0285466 A1* | 11/2008 | Salam et al. | 370/241.1 |
| 2010/0172245 A1* | 7/2010 | Sridhar et al. | 370/242 |
| 2012/0224471 A1* | 9/2012 | Vinod et al. | 370/222 |

FOREIGN PATENT DOCUMENTS

EP    2 023 541 A1    2/2009

OTHER PUBLICATIONS

Extended European Search Report for European Application No. 11193016.0 (Nov. 28, 2012).

* cited by examiner

*Primary Examiner* — Anh-Vu Ly
*Assistant Examiner* — Hashim Bhatti
(74) *Attorney, Agent, or Firm* — Jenkins, Wilson, Taylor & Hunt, P.A.

(57) ABSTRACT

A method for providing an uplink over an access ring comprising access devices and at least one aggregation device, wherein each device of said access ring has ring interfaces connecting said device to neighboring devices in said access ring, wherein one access device of said access ring is configured as a ring master device which sends connectivity check messages on both its ring interfaces around said access ring to itself to detect a connectivity failure in said access ring, and wherein said ring master device changes a state of one of its ring interfaces depending on the detection result.

13 Claims, 8 Drawing Sheets

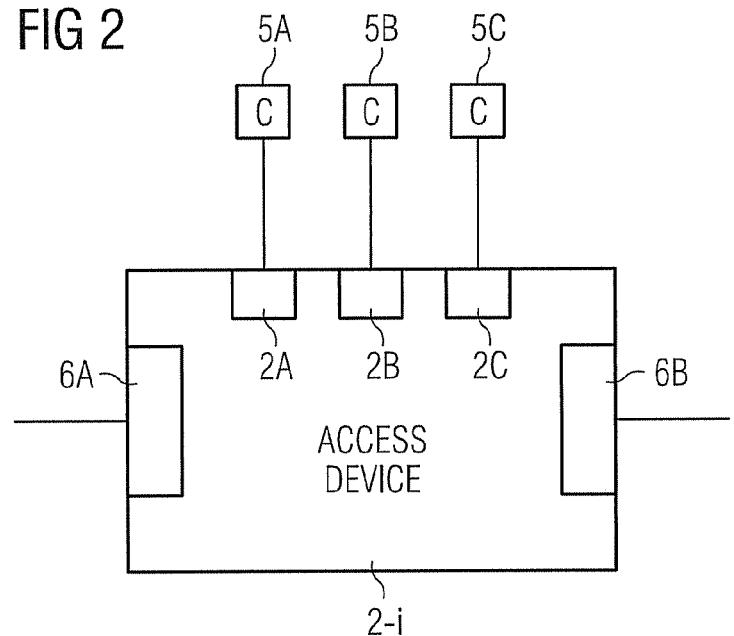
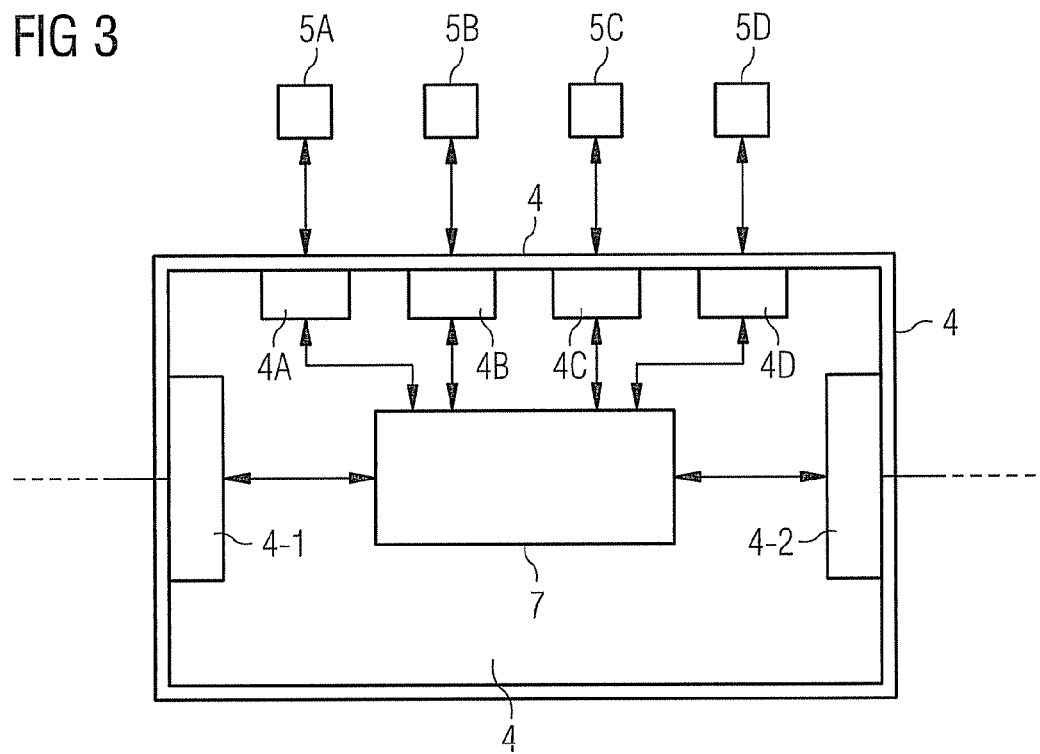

METHOD AND APPARATUS FOR PROVIDING AN UPLINK OVER AN ACCESS RING

TECHNICAL BACKGROUND

The invention relates to a method and apparatus for providing an uplink over an access ring comprising access devices and at least one aggregation device.

Service providers deploy in many cases network access in rings such as fibre rings to save fibre utilization while providing redundancy at the same time. Further it is desirable to have an option of dual homing those access rings to diverse termination points or clients. Further, conventional ring protection protocols as used for example in Ethernet access rings are complex and require an active participation from all nodes or access devices on the access ring. Some implementations of existing ring protection protocols are proprietary thus prohibiting use of different vendors for access and aggregation equipment. Standard 802.1 IEEE implementations and even the so-called rapid spanning tree protocol RSTP are too slow to meet common 50 ms failover requirements. Accordingly, it is an object of the present invention to provide a method and an apparatus for providing an uplink over a shared access ring topology that may be homed to diverse aggregation devices.

SUMMARY OF THE INVENTION

The invention provides a method for providing an uplink over an access ring comprising access devices and at least one aggregation device, wherein each device of said access ring has ring interfaces connecting said device to neighbouring devices in said access ring, wherein one access device of said access ring is configured as a ring master device which sends connectivity check messages on both its ring interfaces around said access ring to itself to detect a connectivity failure in said access ring, wherein said ring master device changes a state of one of its ring interfaces depending on the detection result.

In a possible embodiment of the method according to the present invention the ring master device opens one of its ring interfaces having been blocked for data traffic for avoidance of a closed loop in said access ring to restore connectivity in said access ring if a connectivity failure is detected by said ring master device.

In a possible embodiment of the method according to the present invention the ring master device sends the connectivity check messages at a constant rate with an adaptable default interval between two consecutive connectivity check messages.

In a possible embodiment of the method according to the present invention a connectivity failure in said access ring is detected by the ring master device of said access ring, if the ring master device does not receive a predetermined number of connectivity check messages at both its ring interfaces for a predetermined time.

In a possible embodiment of the method according to the present invention a connectivity failure in said access ring is detected by the ring master device of said access ring if the ring master device does not receive three consecutive connectivity check messages at both its ring interfaces.

In a possible embodiment of the method according to the present invention the ring master device blocks one of its ring interfaces if it receives a connectivity check message on either of its ring interfaces within a predetermined time.

In a possible embodiment of the method according to the present invention a maintenance end point is assigned to each ring interface of said ring master device.

In a possible embodiment of the method according to the present invention a connectivity check message control VLAN is provided for transporting connectivity check messages around said access ring transparently.

In a possible embodiment of the method according to the present invention the ring master device of said access ring sends a spanning tree topology change notification via the connectivity check message control VLAN on both its ring interfaces upon each change of a state of one of its ring interfaces.

In a possible embodiment of the method according to the present invention the devices of said access ring are formed by Ethernet devices.

The invention further provides a ring master device comprising:

ring interfaces connecting said ring master device to neighbouring devices of an access ring, wherein said ring master device is configured to send connectivity check messages on both its ring interfaces around said access ring to itself to detect a connectivity failure in said access ring and to change the state of one of its ring interfaces depending on the detection result.

In a possible embodiment the ring master device opens one of its ring interfaces having been blocked for data traffic for avoidance of a closed loop in said access ring to restore connectivity in said access ring if a connectivity failure is detected by said ring master device.

In a possible embodiment of the ring master device the ring master device sends the connectivity check messages at a constant rate with an adaptable default interval between two consecutive connectivity check messages.

In a possible embodiment of the ring master device a connectivity failure in said access ring is detected by the ring master device of said access ring if the ring master device does not receive a predetermined number of connectivity check messages at both its ring interfaces for a predetermined time.

In a possible embodiment of the ring master device according to the present invention the ring master device detects a connectivity failure in said access ring if the ring master device does not receive three consecutive connectivity check messages at both its ring interfaces.

In a possible embodiment of the ring master device according to the present invention the ring master device blocks one of its ring interfaces if it receives a connectivity check message on either of its ring interfaces within a predetermined time.

In a possible embodiment of the ring master device according to the present invention a maintenance end point is assigned to each ring interface of said ring master device.

In a possible embodiment of the ring master device according to the present invention the ring master device sends a spanning tree topology change notification via the connectivity check message control VLAN on both its ring interfaces upon each change of a state of one of its ring interfaces.

In a possible embodiment of the ring master device the ring master devices is an access device formed by an Ethernet device which is configured as a ring master device.

The invention further provides an access ring comprising a ring master device, access devices each having at least one client interface for connecting a terminal device to said access ring and comprising at least one aggregation device adapted to connect said access ring to a network core.

In a possible embodiment of the access ring according to the present invention the aggregation device is an aggregation switch device adapted to connect said access ring with said network core.

In a possible embodiment of the access ring according to the present invention an access device being positioned farthest from said network core in said access ring is configured as the ring master device of said access ring.

In a possible embodiment of the access ring according to the present invention at least some of the devices of said access ring are formed by Ethernet devices being connected to each other by interfaces transporting Ethernet packets.

In a possible embodiment of the access ring according to the present invention the devices are connected via wired or wireless links.

In a possible embodiment of the access ring according to the present invention the Ethernet packets are transported between said Ethernet devices through an optical medium.

In a still further possible embodiment of the access ring according to the present invention the Ethernet packets are transported between said Ethernet devices via an electrical transport medium.

BRIEF DESCRIPTION OF THE FIGURES

The following possible embodiments of the method and apparatus according to the present invention are describes with reference to the enclosed figures.

FIG. 2 shows a possible embodiment of an access device provided with an access ring as shown in FIG. 1;

FIG. 3 shows a possible embodiment of a ring master device according to a second aspect of the present invention as used in the access ring shown in FIG. 1;

DETAILED DESCRIPTION OF EMBODIMENTS

Figure 1:
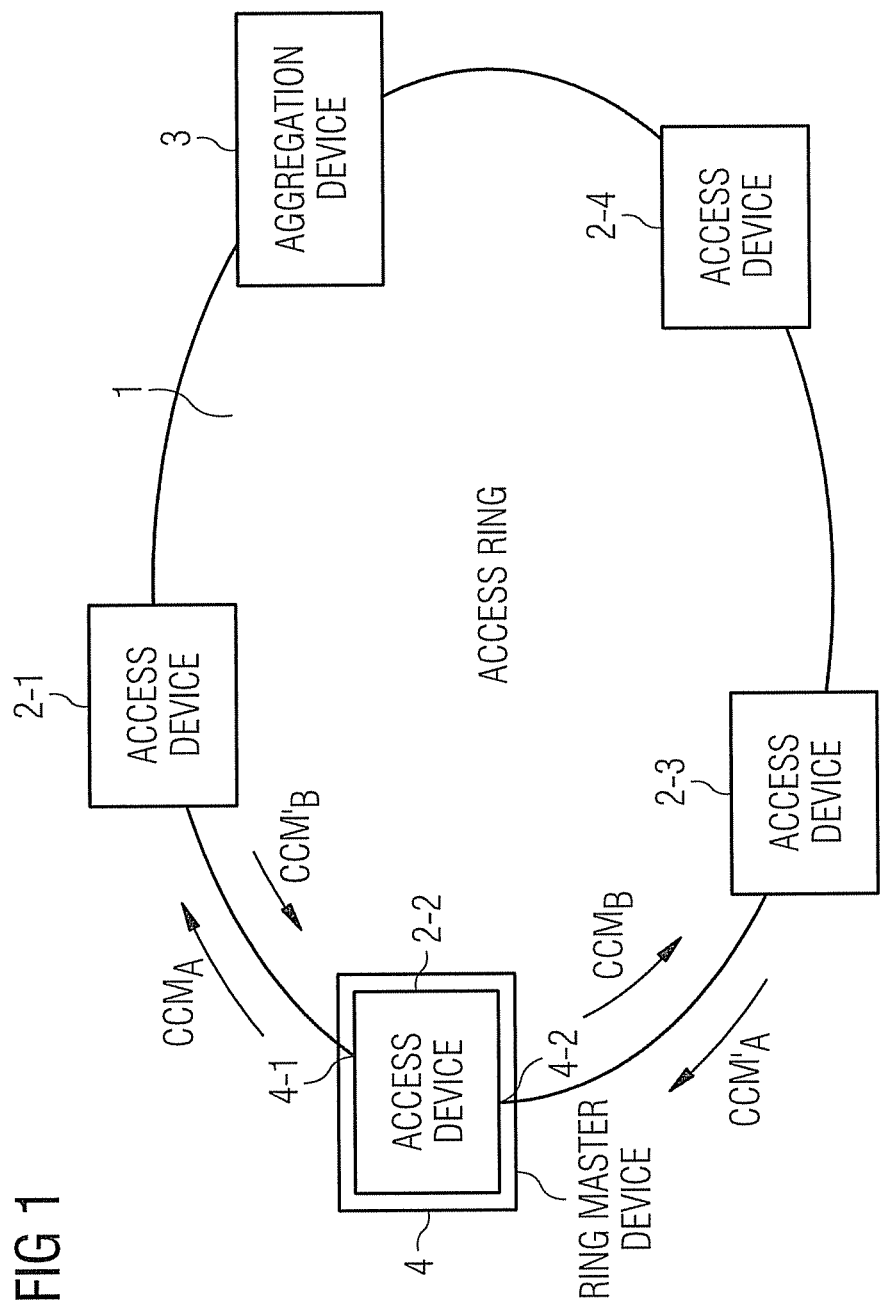
FIG. 1 shows a diagram for illustrating a possible embodiment of an access ring according to an aspect of the present invention.

As can be seen in FIG. 1 an access ring 1 according to the present invention comprises in the shown embodiment several access devices 2-1, 2-2, 2-3, 2-4 connected to at least one aggregation device 3 in a ring topology. The aggregation device 3 is adapted to connect the access ring 1 to a network core. The number of access devices 2-i can vary. In the access ring 1 according to the present invention one access device 2-i of the access ring 1 is configured as a ring master device. In the shown implementation of FIG. 1 the access device 2-2 is configured as a ring master device 4. In a possible embodiment the access device being positioned farthest from the network core within said access ring 1 is configured as the ring master device of the access ring 1. The aggregation device 3 shown in FIG. 1 can be formed by an aggregation switch device adapted to connect the access ring 1 with the network core. In a possible embodiment the access devices 2-i within the access ring 1 are formed by Ethernet devices being connected to each other by interfaces transporting Ethernet packets. In a possible implementation the Ethernet packets are transported between the Ethernet devices 2-i through an optical transport medium. In an alternative embodiment the Ethernet packets are transported between the Ethernet access devices 2-i through an electrical transport medium. Accordingly, the links between the access devices as shown in FIG. 1 can be formed by an electrical transport medium such as a wire or cable or by an optical transport medium such as optical fibres. In these embodiments the Ethernet packets are transported via wired links. In an alternative embodiment it is also possible that the links between the access devices 2-i of the access ring 1 are formed by wireless links transporting data packets such as Ethernet packets.

The access ring 1 according to the present invention can provide and support any physical ring topology using administration configuration data and operational methods which can be employed for point-to-point access services. The access ring 1 can terminate on any redundant diverse aggregation switch that supports for example standard VLAN (virtual local area network) based bridging. The access ring 1 according to the present invention as shown in FIG. 1 may not assume special features from the aggregation layer and therefore allows the access ring 1 consisting of access devices 2-i to interoperate with any incumbent core network of any vendor without providing a bookended solution. The remote access devices 2-i in the access ring 1 form a chain of devices that terminates to one or two upstream aggregation devices 3 or aggregation switches. In a possible embodiment all nodes, i.e. access devices 2-i, provide VLAN based broadcast domains connecting access ports for clients to two ring uplink ports per node. MAC learning is optional and provided within a possible embodiment of the access ring 1 as shown in FIG. 1. In a further possible implementation a MAC table flush operation is performed during a topology change of the network topology. Loop avoidance to prevent duplicate and recirculating data packets within the loop can be performed by the access devices 2-i or one of the aggregation devices 3 of the access ring 1.

As can be seen in FIG. 1 each access device 2-i of said access ring 1 has ring interfaces connecting said access device to neighbouring devices in said access ring 1. In the embodiment shown in FIG. 1 the access device 2-2 of the access ring 1 is configured as a ring master device 4. The ring master device 4 sends connectivity check messages CCM on both its ring interfaces 4-1, 4-2 around the access ring 1 to itself to detect a connectivity failure in the access ring 1 as illustrated in FIG. 1. In the embodiment shown in FIG. 1 the ring master device 4, i.e. the access device 2-2 being configured as a ring master device, transmits via a first ring interface 4-1, a first connectivity check message $CCM_A$ around the access ring 1, i.e. through the access device 2-1, the aggregation device 3, the access device 2-4 and the access device 2-3 clockwise to itself to detect whether the sent first connectivity check message $CCM_A$ is received as a connectivity change message $CCM_A'$ at the other ring interface 4-2 of the ring master device 4. Furthermore, the ring master device 4 sends a second connectivity check message $CCM_B$ from the second ring interface 4-2 counter-clockwise through the access device 2-3, the access device 2-4, the aggregation device 3 and the access device 2-1 to its other ring interface 4-1 to check whether the sent second connectivity check message $CCM_B$ is received as a connectivity check message $CCM_B'$ at its first ring interface 4-1. Accordingly, the connectivity check messages CCM run in both directions through the access ring 1. The connectivity check messages or CCM frames can be assigned in a possible embodiment to any VLAN or not VLAN tagged. The presence and value of this control VLAN is in a possible embodiment user configurable. The rate of the transmitted connectivity check messages CCMs are also configurable in a possible embodiment. In a possible implementation the default interval between two connectivity check messages CCMs transmitted by the ring master device 4 is 10 ms. In a possible implementation the failover time is configured to be three and a half times the default interval, i.e. for example 35 ms. The ring master device 4 of the access ring 1 detects in a possible embodiment the occurrence of a connectivity failure in the access ring 1 if the ring master device 4 does not receive a predetermined number of connectivity check messages CCMs at its ring interfaces 4-1, 4-2 for a predetermined time. For example, the ring master device 4 detects a connectivity failure in the access ring 1 if it does not receive any connectivity check message CCM on both of its ring interfaces 4-i for the duration of three and a half times the default interval of 10 ms, i.e. for a time period of 35 ms. In a possible embodiment there is a 10 ms default interval for transmitting a connectivity check message CCM, however, it can be set in other embodiments for example to 3.3 ms, 100 ms or 1 s.

The ring master device 4 of the access ring 1 as shown in FIG. 1 changes a state of one of its ring interfaces 4-1, 4-2 depending on the detection result. In a possible embodiment the ring master device 4 opens one of its ring interfaces 4-i having been blocked until then for data traffic for avoidance of a closed loop in said access ring 1 to restore a connectivity in said access ring 1 if a connectivity failure is detected by the ring master device 4. On the other hand, the ring master device 4 blocks one of its ring interfaces 4-1, 4-2 if it receives a connectivity check message CCM on either of its ring interfaces 4-1, 4-2. Accordingly, if the ring master 4 receives a connectivity check message CCM on either of its ring interfaces 4-1, 4-2 as shown in FIG. 1 a closed loop in the access ring 1 is detected by the ring master device 4 and consequently the ring master device 4 blocks immediately one of its ring interfaces 4-1, 4-2 being a secondary ring uplink to interrupt the undesired loop within the access ring 1. Accordingly, the ring master device can detect at least two different types of connectivity failures in the access ring 1. A first type of connectivity failure is detected if the ring master device 4 does not get any connectivity check message CCM at its ring interfaces 4-1, 4-2. The ring master device 4 reacts to this connectivity failure by opening one of its blocked ring interfaces 4-i to restore a connectivity in the access ring 1. As a second type of connectivity failure the ring master device 4 detects a closed loop in the access ring 1 if it receives connectivity check messages CCMs on either ring interfaces 4-1, 4-2. In this case the ring master device 4 reacts also by changing the state of one of its ring interfaces 4-1, 4-2 by blocking one of its ring interfaces 4-1, 4-2.

There is no particular need with the method according to the present invention for a user to configure which ring interface 4-i of the ring master device 4 is primary or secondary. The default can be to assume that the port or ring interface with a higher internal interface ID operates as a secondary interface. In a possible embodiment a Maintenance End Point MEP is assigned to each ring interface 4-i of the ring master device 4. When blocking the secondary ring interface the associated Maintenance End Point MEP continues to send and to receive connectivity check messages CCMs whereas all other traffic to be sent or received will be dropped. If both Maintenance End Points MEPs of the two ring interfaces 4-1, 4-2 of the ring master device 4 miss receipt of three consecutive connectivity check messages CCMs caused e.g. by blocking somewhere else within the access ring 1 the ring master device 4 restores the connectivity across the redundant signal path. If there is, for example, a link or node failure in the access ring 1 the ring master device 4 will not receive connectivity check messages CCMs anymore and unblocks or opens one of its ring interfaces 4-1, 4-2 to restore connectivity in the access ring 1. If there is for instance a link failure between access device 2-1 and the aggregation device 3 the first connectivity check message $CCM_A$ sent by the first ring interface 4-1 can not be received by the second ring interface 4-2 and also the second connectivity check message $CCM_B$ transmitted by the second ring interface 4-2 will no longer be received by the first ring interface 4-1 of the ring master device 4. When the ring master device 4 does not receive any connectivity check messages CCMs for a predetermined time it opens up one of its ring interfaces 4-1, 4-2 having been blocked for data traffic within the access ring 1 to restore a connectivity across the redundancy signal path in the access ring 1.

For either change of the secondary uplink state, blocked or unblocked, the ring master device 4 sends in a possible embodiment a spanning tree topology change notification on the CCM control VLAN on both uplink ports. In the embodiment where the access devices 2-i have a MAC-learning capability and do support STP the access devices 2-i can flush in a possible implementation their MAC tables and use an alternate ring direction, instead of waiting for a MAC entry time out. In a possible embodiment of the access ring 1 as shown in FIG. 1 the access ring 1 is switchable between operation modes. In a passive operation mode the access ring 1 relies on an external loop avoidance protocol such as RSTP performed by the aggregation switch equipment such as an aggregation device 3 as shown in FIG. 1. In the active operation mode a preconfigured node of the access ring 1 for example the access device 2-2 as shown in FIG. 1 operates as a ring master node 4 which detects and resolves working loop conditions.

FIG. 2 shows a block diagram for illustrating a possible embodiment of an access device 2-i provided with an access ring 1 as shown in FIG. 1. The access device 2-i can be formed by an Ethernet device. The access device 2-i has client interfaces for connecting clients to the access device 2-i. In the shown exemplary embodiment of the access device 2-i the access device 2-i comprises three client interfaces 2A, 2B, 2C for connecting client or terminal devices 5A, 5B, 5C as shown in FIG. 2. Furthermore, the access device 2-i comprises at least two ring interfaces 6A, 6B connecting the access device to neighbouring devices within said access ring 1. The forwarding of data in data packets to the neighbouring devices can be performed via a wireless or wired link wherein the wired link can be either an electrical or an optical link. The connection of the clients 5A, 5B, 5C to the interfaces 2A, 2B, 2C of the access device 2-i can also be either wired or wireless.

FIG. 3 shows a block diagram of a possible embodiment of a ring master device 4 as employed within the access ring 1 according to the present invention. In the shown implementation of the ring master device 4 the ring master device 4 also comprises client interfaces 4A, 4B, 4C, 4D for connecting client or terminal devices 5A, 5B, 5C, 5D to the ring master device 4. The ring master device 4 has a first ring interface 4-1 and a second ring interface 4-2 as shown in FIG. 3. In a possible embodiment one of the two ring interfaces 4-1, 4-2 is configured by a user to be a primary ring interface whereas the other ring interface is configured to be a secondary ring interface. In an alternative embodiment there is no need for a user to configure which ring interface 4-1, 4-2 is primary or secondary. In this embodiment a default setting can be provided wherein e.g. the port or interface with the higher internal interface ID becomes automatically the secondary interface. In a possible embodiment the ring master device 4 comprises a control unit 7 as shown in FIG. 3. In a possible implementation the ring master device 4 is switchable between a passive operation mode and an active operation mode. In the passive operation mode the device 4 as shown in FIG. 3 operates as a normal access device 2-i. The access ring 1 as shown in FIG. 1 operates in the passive operation mode if none of its access devices 2-I forms a ring master device 4 running a specific ring control protocol for performing the method according to the present invention. In this passive operation mode of the access ring 1 the aggregation devices 3 are responsible for loop avoidance. The aggregation devices 3 in the passive operation mode of the access ring 1 perform a protocol such as a spanning tree protocol that does detect a loop and performs a blocking accordingly. The aggregation layer blocks one of the ring uplinks or ring interfaces of the aggregation device 3 during normal operation and forwards a corresponding message to both uplinks when detecting a remote link failure. In this passive operation mode of the access ring 1 the access devices 2-i are unaware of the loop avoidance protocol and simply pass along packets through the chain of devices. Accordingly, in the passive operation mode of the access ring 1 the master ring device 4 as shown in FIG. 3 works as a normal access device and it is the responsibility of the aggregation devices 3 to avoid loops and drop redundantly transmitted data packets. Likewise a data packet sourced from an aggregation device 3 to a completely connected access ring 1 must only be transmitted on the single unblocked link of the aggregation device 3. In event of a remote link failure of the access ring 1 the loop avoidance protocol on the aggregation device 3 does no longer detect a loop and unblocks the protection path to open transmission to both links of the aggregation device 3.

When switching from the passive operation mode to the active operation node one of the access devices 2-i such as the access device 2-2 is switched to a configuration where it operates as a ring master device 4 to detect and to block loops within the access ring 1. Accordingly, in the active operation mode there is no special requirement for the aggregation devices 3 to anything other than work as a standard VLAN based bridge. The ring master device 4 as shown in FIG. 3 checks connectivity through the access ring 1 between its two uplink ports. If the access ring 1 is closed, providing a connectivity loop, the ring master device 4 does not forward or receive data traffic on its secondary ring uplink or ring interface. If connectivity is not complete and the access ring 1 is somehow broken then the ring master device 4 does send/receive data on both of its uplinks or ring interfaces 4-1, 4-2. Accordingly, in a possible embodiment the access ring 1 is switchable between an active operation mode and a passive operation mode. In a possible embodiment a specific access device 2-i is preconfigured to operate as a ring master device 4 in the active operation mode of the access ring 1. For example, in a possible embodiment the access device 2-i being located farthest away from the core network or aggregation devices 3 is preconfigured to become a ring master device 4 for active operation mode as shown in FIG. 3.

Figure 4:
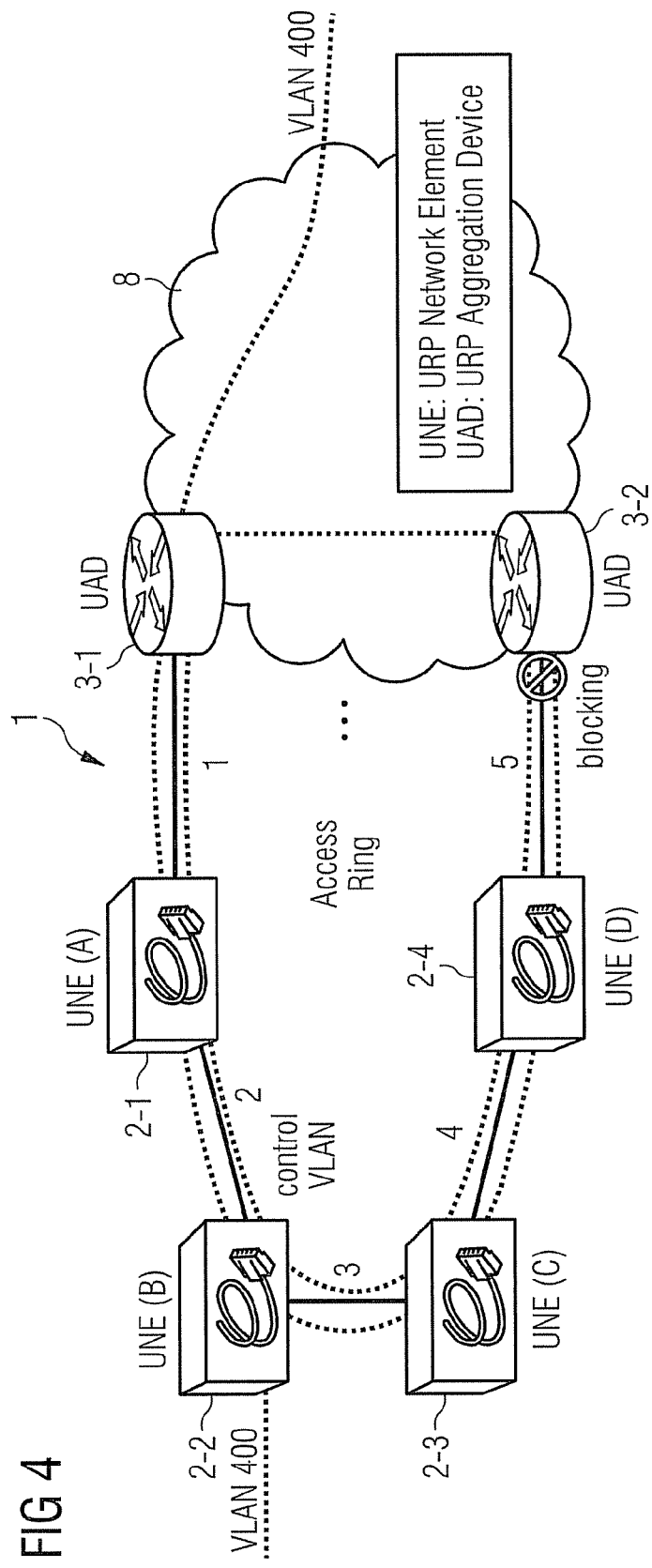
FIG. 4 shows a diagram for illustrating a possible embodiment of an access ring according to the present invention in a passive ring mode.

FIG. 4 shows a diagram for illustrating a possible embodiment of the access ring 1 according to the present invention operating in the passive ring operation mode. In a passive ring operation mode the aggregation devices or URP aggregation devices (URP: Universal Ring Protection) 3-1, 3-2 are connected to the core network 8 and are responsible to avoid loops and to drop redundantly transmitted data packets. The passive access ring 1 as shown in FIG. 4 ensures interoperability and operational simplicity. Accordingly, it is possible to add and remove nodes or access devices 2-i without any reconfiguration. There is no theoretical limit to the number of access devices or URP network elements 2-i in the access ring 1 as shown in FIG. 4. As can be seen in FIG. 4 in the passive operation mode of the access ring 1 the aggregation device 3-2 provides a blocking of the link to the access device 2-4 to avoid a closed loop during normal operation. The aggregation devices 3-1, 3-2 each run a protocol like a spanning tree protocol to detect a loop and to perform blocking or unblocking accordingly. During normal operation of the aggregation devices 3-1, 3-2, for example the aggregation device 3-2 as shown in FIG. 4, blocks one of its ring uplinks to avoid a closed loop within the access ring 1. As can be seen in FIG. 4 there is a loop control VLAN spanning from the aggregation device 3-1 to the other aggregation device 3-2 and a VLAN 400 data protocol signal path for forwarding data packets.

Figure 5:
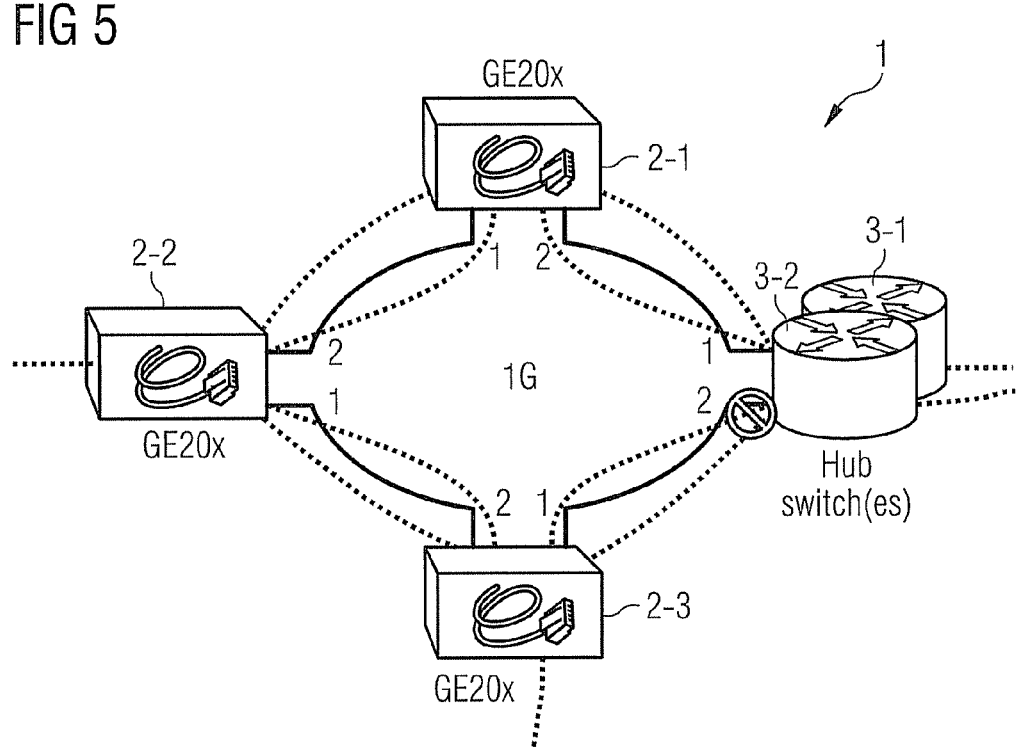
FIG. 5 shows a diagram for illustrating a possible embodiment of an access ring according to the present invention performing a passive operation.

FIG. 5 shows a further diagram for illustrating an exemplary Gigabit Ethernet access ring 1 being in the passive operation mode. In the shown example access traffic enters the access ring 1 in both directions. Accordingly, data packets flood to both ring uplinks without MAC learning. Ring uplink ports pass-through transit traffic. Accordingly, service-defined flows terminate at configured nodes or access devices 2-i forwarded only to access ports. Unmatched data packets are passed from a first wide area network WAN1 to a second wide area network WAN2 or vice versa from a second wide area network WAN2 to a first wide area network WAN1. An uplink queue can be provided which sends ring transit traffic before new packets arrive from access ports. In a possible embodiment committed information ring CIR services are provided and do not exceed 1 Gbps aggregate. As an alternative, an all best effort service is provided with no guarantee and undefined behaviour in contention. In a possible embodiment a MSTP/MRP control protocol rides a control VLAN looping through the access ring 1. In this embodiment the aggregation switch 3 does block the secondary trunk or ring interface. An access device 2-1 such as a GE20X sends redundant data packets to both wide area networks WANs, wherein one is blocked by the aggregation switch 3. The failover time does solely base on the loop avoidance implemented at the aggregation device or hub 3.

Figure 6:
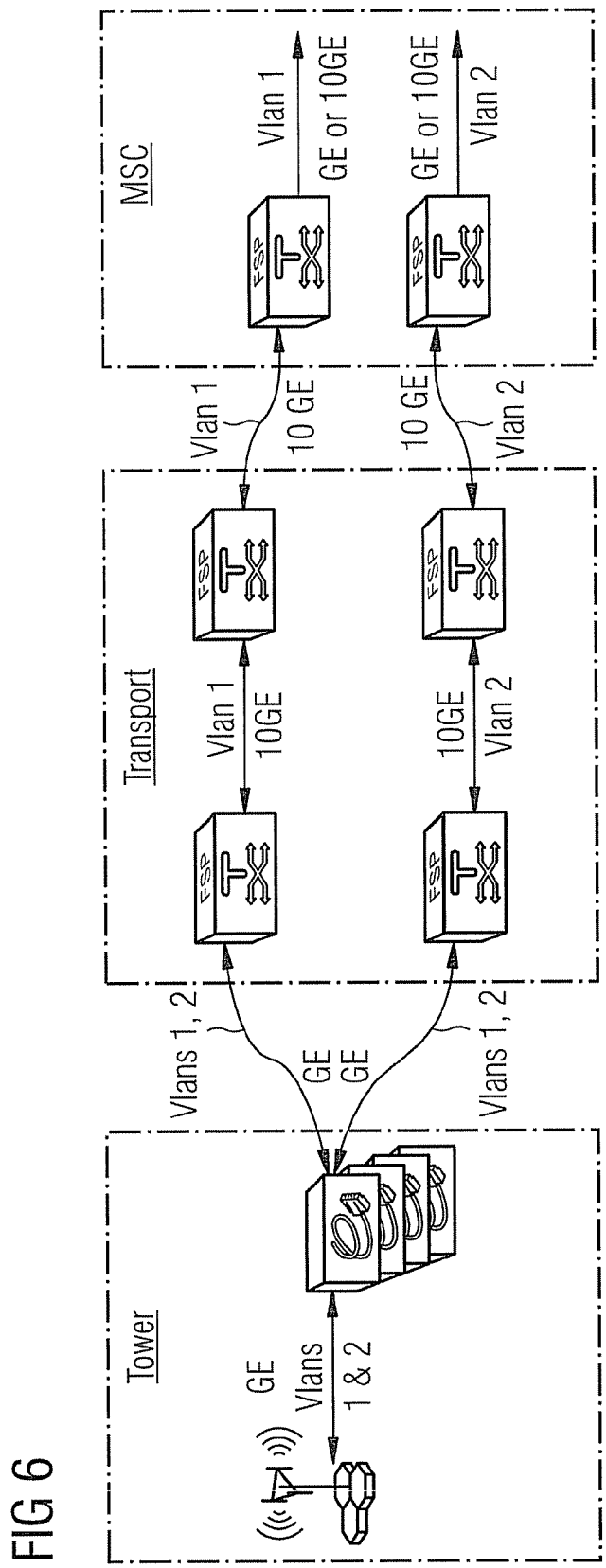
FIG. 6 shows a diagram for illustrating a further possible embodiment of an access ring with end-to-end redundancy.

FIG. 6 shows a possible embodiment of an access ring 1 with a tower connected by means of a transport entity to a MSC. Hence, FIG. 6 shows VLANs provided for transmitting on both uplinks two redundant aggregation points. Each aggregation point accepts half the VLANs and does diversely transport to the MSC. MO routers at the tower and MSC direct the traffic to appropriate VLANs for protection. In this arrangement there is no need for a loop avoidance protocol.

Figure 7:
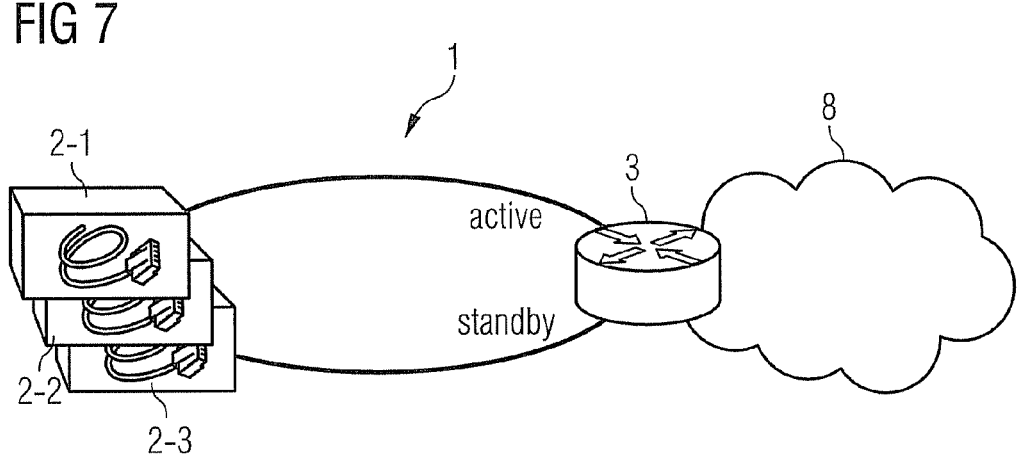
FIG. 7 shows a diagram for illustrating an access ring according to a possible embodiment of the present invention with flex link protection.

FIG. 7 shows an arrangement of an access ring 1 with flexible link protection. The devices transmit and receive on both sides. Failover time can be less than 50 ms. There can be a LAG link aggregation that allows stacking multiple boxes at site.

Figure 8B:
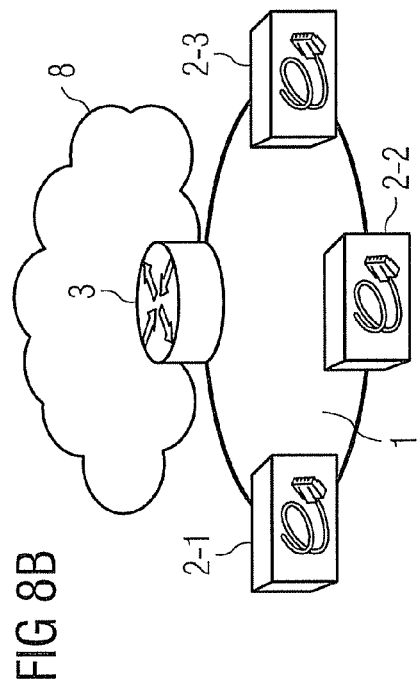
FIGS. 8A-8D show diagrams for illustrating possible and not possible embodiments of an access ring according to the present invention.
Figure 8D:
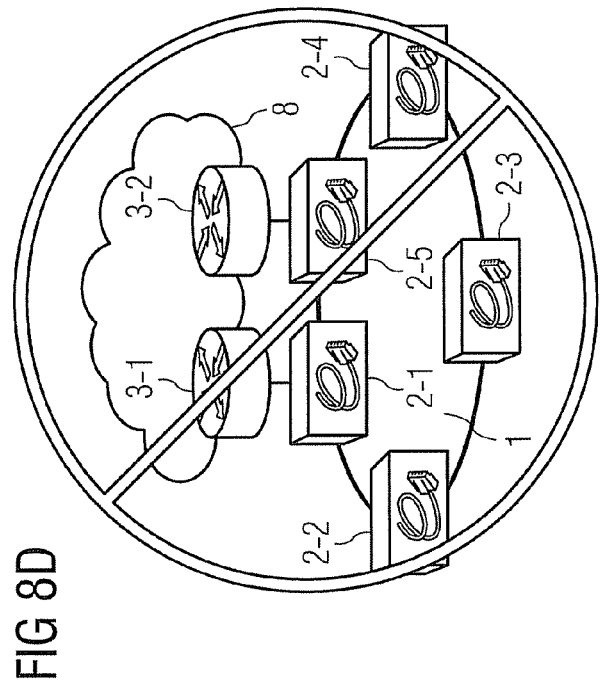
Figure 8A:
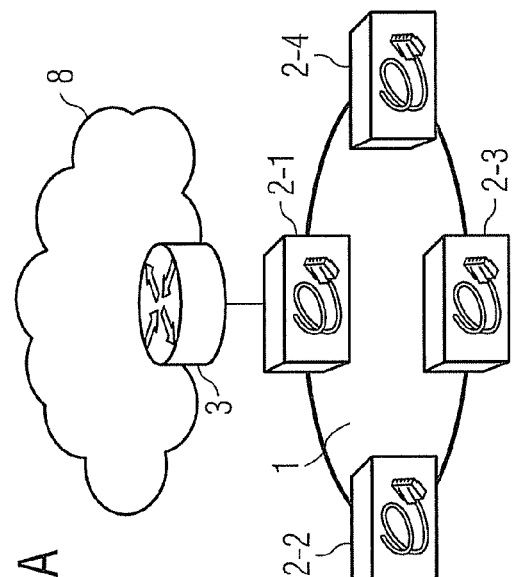

FIGS. 8A, 8B, 8C, and 8D show different possible arrangements of an access ring 1 according to the present invention. FIG. 8A shows an embodiment where a single aggregation device 3 is provided connecting the access ring 1 of a core network 8. In the embodiment of FIG. 8A the aggregation device 3 is connected to a port of an access device 2-1. FIG.

8B shows a further possible embodiment of an access ring 1 according to the present invention. In the embodiment of FIG. 8B there is also provided a single aggregation device 3, wherein the aggregation device 3 is connected within the loop of the access ring 1 as shown in FIG. 8B. In contrast, in the embodiment of FIG. 8A the aggregation device 3 is connected to a port of the access device 2-1 and does not form part of the loop of the access ring 1.

Figure 8C:
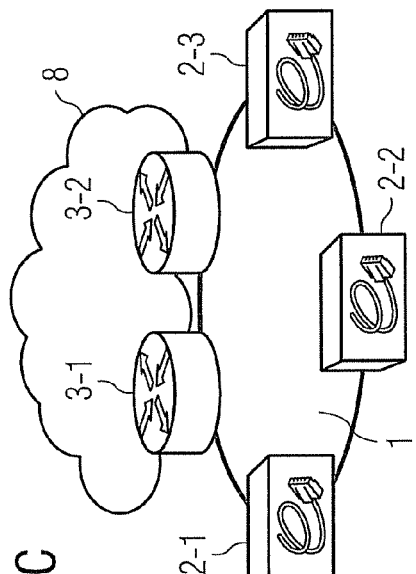

FIG. 8C shows a further possible embodiment, wherein more than one aggregation device 3 is provided for connecting the access ring 1 to the core network 8. In the embodiment of FIG. 8C two aggregation devices 3-1, 3-2 are provided within the loop of the access ring 1. In contrast, an arrangement as shown in FIG. 8D having two aggregation devices 3-1, 3-2 being connected to client ports of access devices 2-1, 2-5 is not admissible.

Figure 9:
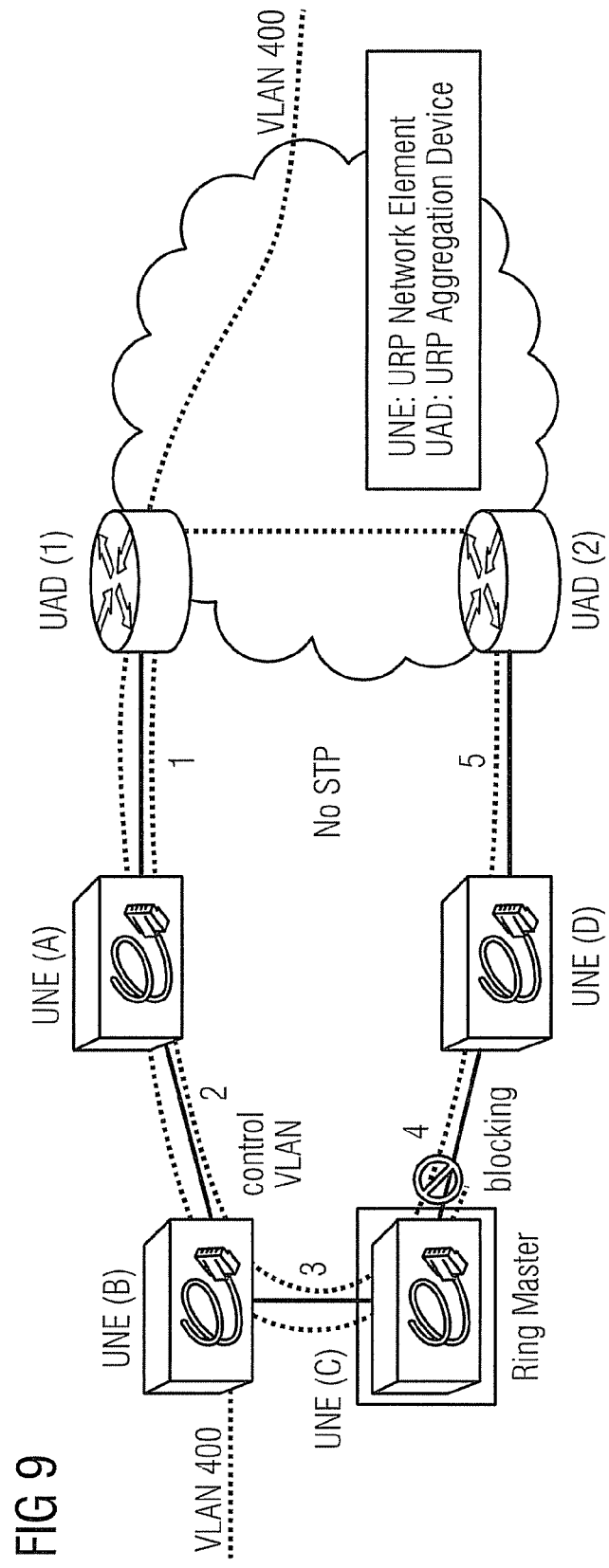
FIG. 9 shows a diagram for illustrating a possible embodiment of an access ring according to the present invention with ring master loop avoidance.

FIG. 9 shows a diagram for illustrating an access ring 1 comprising a ring master device 4 for loop avoidance. In the embodiment shown in FIG. 9 the access device 2-3 is configured to be a ring master device 4. FIG. 9 is similar to FIG. 4 showing the same arrangement of FIG. 9 in a passive operation mode. It can be seen in FIG. 9 that a universal ring protection URP loop avoidance protocol implementing the method according to the present invention passes through a configurable control VLAN. In the active operation mode only one access device 2-i is active, i.e. the access device 2-3. All other access devices 2-i remain passive. It is possible to add and remove nodes or access devices 2-i without any reconfiguration. Accordingly, with the system and method according to the present invention access device feature requirements are light weight and almost any brand of upstream aggregation switch 3 can operate with the access devices 2-i. Free from protocol complexity a failover is quickly performed and highly reliable with no theoretical limit to the number of ring network elements or access devices 2-i. Benefits of the universal ring protocol URP implementing the method according to the present invention as employed by an access ring 1 according to the present invention are operational simplicity, easy access device implementation and universal interoperability with redundant third party aggregation systems or aggregation devices 3. Accordingly, the method according to the present invention is also backward compatible to already existing access ring infrastructures.

The invention claimed is:

1. A method for providing an uplink over an access ring comprising access devices and at least one aggregation device,
    wherein each device of said access ring has ring interfaces connecting said device to neighbouring devices in said access ring,
    wherein one access device of said access ring is configured as a ring master device which sends connectivity check messages on both its ring interfaces around said access ring to itself to detect a connectivity failure in said access ring,
    wherein said ring master device changes a state of one of its ring interfaces depending on the detection result;
    the method comprising:
    transporting connectivity check messages around said access ring via a connectivity check message control Virtual Local Area Network (VLAN) provided between aggregation devices of said at least one aggregation device; and
    sending by the ring master device of said access ring a spanning tree topology change notification via the connectivity check message control VLAN on both of its ring interfaces upon each change of a state of one of its ring interfaces performed in response to a detection result.

2. The method according to claim 1,
    wherein said ring master device opens one of its ring interfaces having been blocked for data traffic for avoidance of a closed loop in said access ring to restore a connectivity in said access ring if a connectivity failure is detected by said ring master device.

3. The method according to claim 1,
    wherein said ring master device sends the connectivity check messages at a constant rate with an adaptable default interval between two consecutive connectivity check messages.

4. The method according to claim 1,
    wherein a connectivity failure in said access ring is detected by the ring master device of said access ring if the ring master device does not receive a predetermined number of connectivity check messages at both its ring interfaces for a predetermined time.

5. The method according to claim 1,
    wherein said ring master device blocks one of its ring interfaces if it receives a connectivity check message on either of its ring interfaces.

6. The method according to claim 1,
    wherein a maintenance end point is assigned to each ring interface of said ring master device.

7. The method according to claim 1,
    wherein the devices of said access ring are formed by Ethernet devices.

8. A ring master device comprising:
    ring interfaces connecting said ring master device to neighbouring devices of an access ring,
    wherein said ring master device is configured to send, using a controller, connectivity check messages on both its ring interfaces around said access ring to itself to detect a connectivity failure in said access ring and to change the state of one of its ring interfaces depending on the detection result;
    wherein connectivity check messages are transported around said access ring via a connectivity check message control Virtual Local Area Network (VLAN) provided between aggregation devices of at least one aggregation device, and
    wherein the ring master device of said access ring sends a spanning tree topology change notification via the connectivity check message control VLAN on both of its ring interfaces upon each change of a state of one of its ring interfaces performed in response to a detection result.

9. An access ring comprising:
    a ring master device according to claim 8,
    access devices each having at least one client interface for connecting a terminal device to said access ring and comprising:
    at least one aggregation device adapted to connect said access ring to a network core.

10. The access ring according to claim 9,
    wherein said aggregation device is an aggregation switch device adapted to connect said access ring with said network core.

11. The access ring according to claim 9,
    wherein an access device being positioned farthest from said network core in said access ring is configured as the ring master device of said access ring.

12. The access ring according to claim 9, wherein the devices of said access ring are Ethernet devices being connected to each other by interfaces transporting Ethernet packets.

13. The access ring according to claim 12,
wherein said Ethernet packets are transported between said Ethernet devices through an optical or electrical transport medium.

* * * * *